UNITED STATES PATENT OFFICE.

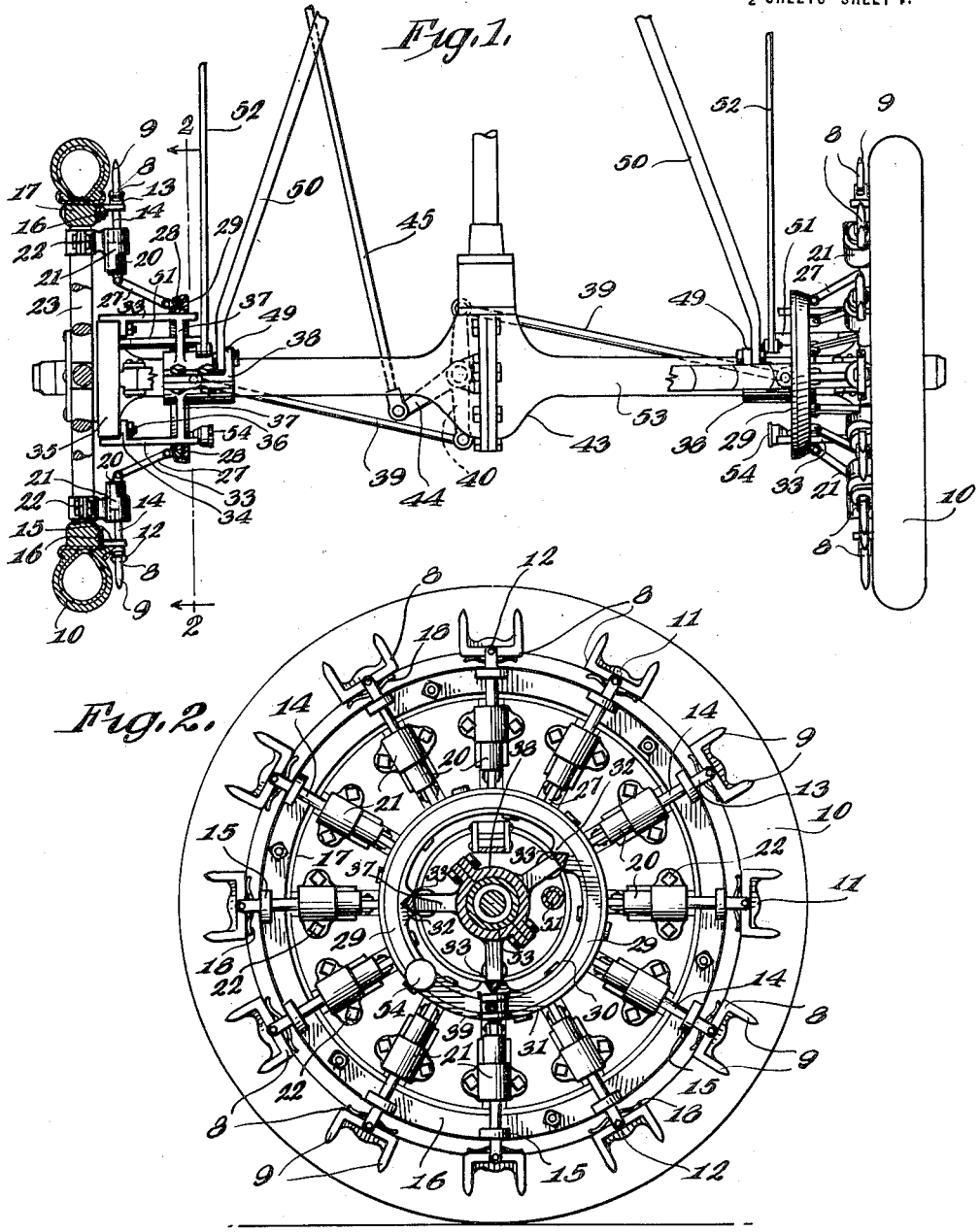

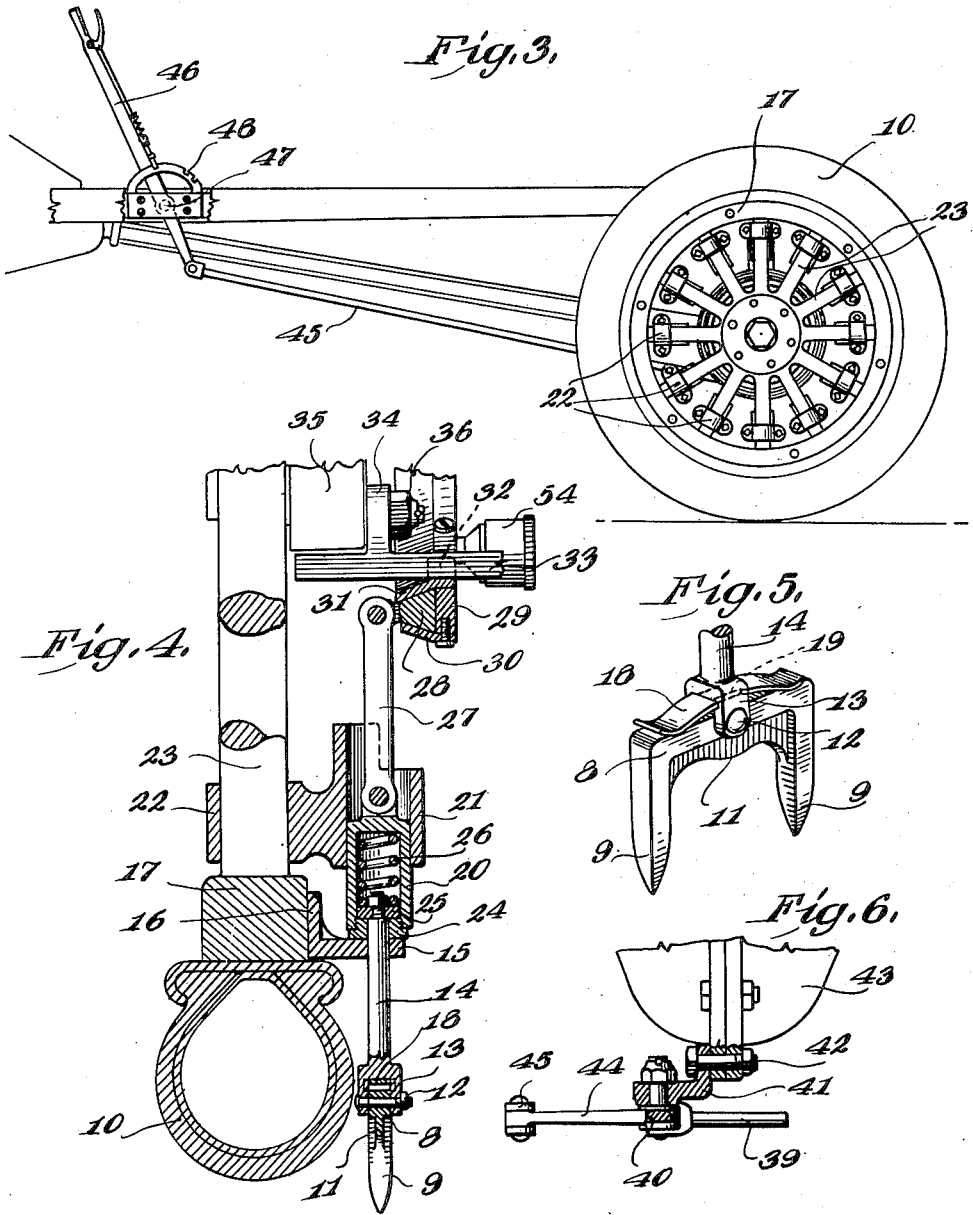

RAYMOND W. HENRY, OF HOLLSOPPLE, PENNSYLVANIA.

TRACTION DEVICE FOR MOTOR VEHICLES.

1,404,767. Specification of Letters Patent. Patented Jan. 31, 1922.

Application filed March 15, 1921. Serial No. 452,448.

*To all whom it may concern:*

Be it known that I, RAYMOND W. HENRY, a citizen of the United States, residing at Hollsopple, in the county of Somerset and State of Pennsylvania, have invented a new and useful Traction Device for Motor Vehicles, of which the following is a specification.

The present invention relates to a traction device for attachment to the propelling wheels of an automobile or other motor vehicle, for the purpose of facilitating traction and preventing skidding, when traveling on roads covered with snow, ice, or mud, it being the primary object of the invention to provide a novel and improved attachment for the propelling wheels of a motor vehicle including traction members which can be projected beyond the periphery of the tires of such wheels, to provide for positive traction when needed.

Another object of the invention is the provision of such a device of novel and improved construction, for attachment to the rear axle housing and wheels of an automobile, for practical and efficient operation, as well as providing for the convenient application of the device without prohibitive trouble or alterations.

A further object is to provide novel means for mounting and operating the traction members, whereby they can be projected and retracted at will, and also permitting them to yield when projected, to avoid damage should the traction members encounter stones or other unyielding objects.

The invention also has for an object to improve the device generally in its construction and details, to enhance the utility and efficiency thereof.

With the foregoing and other objects in view, which will be apparent as the description proceeds, the invention resides in the construction and arrangement of parts hereinafter described and claimed, it being understood that changes can be made within the scope of what is claimed, without departing from the spirit of the invention.

The invention is illustrated in the accompanying drawings, wherein:—

Figure 1 is a plan view showing the device applied to the rear axle housing and wheels of a Ford automobile, portions being shown in section.

Figure 2 is an enlarged section on the line 2—2 of Fig. 1, looking at the inner side of one rear wheel.

Figure 3 is a side elevation of the rear portion of a chassis of a Ford automobile, showing the device installed.

Figure 4 is an enlarged sectional detail showing one of the traction members and corresponding parts in projected position.

Figure 5 is a perspective view of one of the traction members.

Figure 6 is a detail view, partly in section and partly in elevation, showing the mounting of the double lever.

In carrying out the invention, there is provided at the inner side of each propelling wheel an annular set of traction members 8. which are of U-shape, and the terminals of which provide outwardly projecting spurs 9 to be projected beyond the periphery of the tire 10 of the wheel, and each traction member 8 preferably has a strengthening web 11 within the yoke portion thereof, to brace the spurs 9.

The traction members 8 of each wheel are disposed in a plane parallel with the wheel, and are pivoted, as at 12, within the outer bifurcated end portions 13 of radial rods or stems 14, whereby said traction members can oscillate or swing about the pivots 12 in the plane of said members parallel with the wheel. The rods 14 are slidable through guide ears 15 extending from a ring 16 secured to the inner side of the wheel felly 17, for the outward and inward radial sliding movement of said rods and traction members carried thereby. Each traction member 8 is yieldingly held in intermediate position with respect to its swinging movement, by means of a bowed leaf spring 18 having its terminals bearing on the yoke of said member, and the intermediate portion of the spring 18 bears against the outer end of the rod 14, and is notched, as at 19, to engage the bifurcated portion 13, for maintaining said spring in place. The spring 18 permits the traction member to swing in either direction when bearing on the road, whereby to permit both spurs 9 to bear on the road, in the different angular positions of the rod 14. This also permits the traction members to bear on uneven surfaces, and to swing, when necessary, in passing over obstructions.

The means for projecting and retracting the traction members include members 20 slidable radially in guides 21 carried by split clamps 22 embracing the spokes 23 of each wheel. The members 20 are recessed from their outer ends, and have plugs 24 secured to said outer ends through which the rods 14 are slidable. Collars 25 are secured to the inner ends of the rods 14 to move within the members 20, and coiled expansion springs 26 are confined within the recesses of the member 20 between said members and the collars 25, whereby to yielding move the rods 14 outwardly to bring the collars 25 against the plugs 24. The springs 26 permit the rods 14 to move inwardly, thereby providing for the yielding motion of the traction members when projected, should such traction members encounter stones or other unyielding obstructions.

The members 20 of each wheel are connected by toggle links 27 with a ring 28, said links being pivotally connected with said ring and the inner ends of said members 20. The ring 28 is carried by a non-rotatable ring 29 which has outer and inner detachable flanges 30 and 31 overlapping the ring 28 and holding the rings together, but permitting the ring 28 to rotate with the wheel. The rings 28 and 29 are shifted axially of themselves toward and away from the wheel, for the purpose of projecting and retracting the traction members. For this purpose, the inner flange 31 of each ring 29 has notched portions 32 slidable on the guide bars 33 disposed parallel with the axis of the wheel and the rear axle housing 53. Said bars 33 have inwardly extending ears 34 secured to the corresponding brake drum 35 on the end of the housing 53, by means of bolts 36, some of which may be bolts which are already on said brake drum, for convenience in attaching said bars. The bars 33 also have arms 37 near their ends opposite to the drum 35, carried by the sections of a split clamp 38, which embraces the axle housing 53. Thus, by attaching the clamp 38 to the axle housing and the ears 34 to brake drum 35, the guide bars 33 are easily applied and will be rigidly held in position for the sliding movement of the ring 29 on said bars. It is preferable to provide a grease cup 54 on the ring 29 for supplying lubricant between the rings 28 and 29, for purpose of lubrication, inasmuch as the ring 28 will rotate continually with the wheel, or while the ring 29 remains stationary.

In order to control both sets of traction members simultaneously, a link 39 connects each ring 29 with a double lever 40 which is fulcrumed to a bracket 41 which, as shown, is fastened to the differential housing 43 by the lower bolts 42 thereof. The lever 40 has an arm 44 connected by a rod or link 45 with a hand lever 46 fulcrumed, as at 47, to the frame of the machine at a convenient location, and the lever 46 can be held in different positions by the segment 48, as well known.

The device is shown as applied to a Ford automobile, but can be altered, within the scope of what is hereinafter claimed, in applying improvements to various types of motor vehicles. As shown, the clamps 38 have ears 49 to which the radius rods 50 are attached, instead of being attached to the brake drums 35, as usual, and the rock shafts 51 operated by the brake rods 52 are projected or extended from said drums so that the rods 52 and 50 will be clear of the rotating parts of the device.

In operation, when the lever 46 is swung rearwardly, to pull the rod 45 forwardly, the lever 40 is swung whereby to shove the links 39 toward the wheels, which will shift the rings 29 toward the wheels, and the toggle links 27 will force the members 20 outwardly away from the axis of the wheels. The rods 14 and traction members are therefore projected, whereby the spurs 9 will engage the road to provide positive traction, such as when the road is covered with snow, ice, or mud. The links 27 are moved to a position in alinement with the rods 14, whereby the inward pressure on the rods 14 will not have a tendency for shifting the rings 29 backwardly, and the members 20 are thus held in projected position firmly. The traction members can swing or oscillate in bearing on the road, and the rods 14 can also yield when necessary, to afford proper traction without danger of damaging the device. When the assistance of the traction members is no longer needed, they are readily retracted by swinging the lever 46 forwardly, which will pull the rods or links 39 away from the wheels, so that the similar movement of the rings 29, will, through the medium of the toggle links 27, retract the members 20 and rods 14, so that the traction members are removed from the surface of the road.

Having thus described the invention, what is claimed as new is:—

1. A traction device for a propelling wheel including radially movable members, guiding means for said members to be carried by the propelling wheel, traction members carried by said aforesaid members, guide bars parallel with the axis of said wheel and having means for attachment to an axle housing, a non-rotatable ring slidable on said bars, a rotatable ring carried by said non-rotatable ring, toggle links connecting the first named members and rotatable ring, and means for shifting the the non-rotatable ring on said bars.

2. A traction device for a propelling wheel including guide bars to be disposed parallel with the axis of a propelling wheel, having portions for attachment to a brake drum of an axle housing, said bars having arms and a clamp to which the arms extend to embrace said housing, a non-rotatable ring slidable on said bars, a rotatable ring carried by said non-rotatable ring, traction means to be carried by the wheel and having traction members to be projected beyond the periphery of the tire of said wheel, said traction means being operatively connected with said rotatable ring, and means for shifting said non-rotatable ring on said bars to project and retract said traction members.

3. A traction device for a propelling wheel, including radially slidable rods, guiding means for said rods to be carried by a propelling wheel, means for sliding said rods outwardly and inwardly, and U-shaped traction members having their yoke portions pivoted to the outer ends of said rods for the swinging movement of said members in a plane parallel with the plane of the wheel, and said members having their terminals projecting outwardly and forming spurs.

4. A traction device for a propelling wheel, according to claim 3, and including bowed leaf springs between said rods and yoke portions of said members for holding said members in intermediate position for swinging movement in either direction.

5. A traction device for a propelling wheel including radially slidable rods, guiding means for said rods to be carried by a propelling wheel, means for moving said rods outwardy and inwardly, traction members pivoted to said rods and each having a plurality of spurs, and spring means on both sides of said pivot of said traction members for yieldingly holding said traction members in intermediate position for swinging movement in either direction.

6. A traction device for a propelling wheel including radially slidable housing members, guides for said housing members having clamps to embrace spokes of a propelling wheel, rods slidable in said housing members, guiding means for said rods for attachment to the felly of said wheel, springs in said housing members and pressing upon said rods for permitting said rods to yield when moved outwardly with said housing members, means for moving said members outwardly and inwardly, and traction members carried by the outer ends of said rods.

7. A traction device for a propelling wheel including radially movable members, guiding means for said members attachable to a propelling wheel, traction members carried by said radially movable members, toggle links connected to said radially movable members, and means connected to said toggle links for slidable movement towards and away from said wheel, to project or retract said traction members so that when said traction members are projected said toggle links are in alinement with said radially movable members, whereby the inward pressure upon the traction members to slide the slidable member will be eliminated.

RAYMOND W. HENRY.